United States Patent
Kanemaru et al.

(10) Patent No.: US 8,620,521 B2
(45) Date of Patent: Dec. 31, 2013

(54) VEHICLE HVAC WATER SPLASH PREVENTION METHOD AND APPARATUS

(75) Inventors: Junichi Kanemaru, Columbus, OH (US); Shinji Kakizaki, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 386 days.

(21) Appl. No.: 13/031,028

(22) Filed: Feb. 18, 2011

(65) Prior Publication Data
US 2012/0215402 A1   Aug. 23, 2012

(51) Int. Cl.
*B60H 1/00* (2006.01)
(52) U.S. Cl.
USPC .............................. 701/36; 417/44.1
(58) Field of Classification Search
USPC ............... 701/36, 31.7, 33.6, 33.9; 417/44.1; 62/176.5, 132, 238.7; 340/450; 73/290 R, 291
See application file for complete search history.

(56) References Cited

U.S. PATENT DOCUMENTS

| | | | |
|---|---|---|---|
| 6,012,297 A * | 1/2000 | Ichishi et al. | ............ 62/179 |
| 6,600,985 B2 | 7/2003 | Weaver et al. | |
| 6,625,526 B2 | 9/2003 | Gras | |
| 2008/0178620 A1 | 7/2008 | Yelles | |
| 2011/0067422 A1 * | 3/2011 | Ichishi et al. | ............ 62/176.1 |

FOREIGN PATENT DOCUMENTS

| | | | | |
|---|---|---|---|---|
| JP | 08-282245 | | 10/1996 | |
| JP | 09-065125 | | 4/1997 | |
| JP | 2001-058511 | | 3/2001 | |
| JP | 2003-002031 | | 1/2003 | |
| JP | 2005-319874 | | 11/2005 | |
| JP | 2007-076503 | * | 2/2007 | ............ B60H 1/00 |
| JP | 2008-221886 | | 9/2008 | |

* cited by examiner

*Primary Examiner* — Marthe Marc-Coleman
(74) *Attorney, Agent, or Firm* — Rankin Hill & Clark LLP (57) ABSTRACT

A method and apparatus for operating a vehicle HVAC system includes detecting an elevated risk of water splash expulsion from an evaporator through a vent outlet and controlling a voltage supplied to at least one blower of the vehicle HVAC system to reduce a risk of water splash expulsion if the elevated risk is detected. Water splash risk is determined in view of a voltage supplied to a subject blower, a vehicle tilt angle, and a condensation risk or value. The condensation risk or value is determined in view of a window open/close value, a temperature value, and a humidity value. Each of these factors are, either independently or in combination, compared with a corresponding threshold value to determine if the water splash risk warrants voltage control.

20 Claims, 6 Drawing Sheets

Fig. 5

VEHICLE HVAC WATER SPLASH PREVENTION METHOD AND APPARATUS

BACKGROUND

The present disclosure is directed to a method and apparatus for controlling operation of a vehicle heating, ventilation, and air conditioning (HVAC) system, more particularly to a method and apparatus for controlling operation of a vehicle HVAC system (e.g., a vehicle front and rear integrated HVAC system) so as to prevent evaporator water splash from being expelled from a vent outlet.

Vehicle HVAC systems are often designed to improve passenger comfort by attempting to ensure consistent climate control throughout a vehicle cabin. In addition to providing consistent climate control throughout the vehicle cabin, vehicle HVAC systems may also be designed to allow for custom climate control in each of several vehicle cabin regions. A vehicle cabin may be considered to include a front region and a rear region, as well as a front-driver side region, a front-passenger side region, a rear-driver side region, a rear-passenger side region, and (for certain vehicles) a third row region.

Vehicle HVAC systems allowing for customized climate control in different vehicle cabin regions may be equipped with separate components associated with vent outlets assigned to each of the vehicle cabin regions. For example, a vehicle HVAC system allowing for customized climate control for front and rear vehicle cabin regions may provide front and rear blowers and front and rear evaporators (or a single evaporator having front and rear evaporator portions) operably associated with respective front and rear vent outlets. This configuration may also include a front region user interface and a rear region user interface through which a user may provide operational instructions.

However, such a configuration may yield undesirable effects due to differences in the mounting positions of the rear units (blower and evaporator or evaporator portion) compared to the front units. One undesirable effect observed with operation of a front and rear integrated vehicle HVAC system is the occurrence of water splash from an evaporator being output or expelled through a vent outlet of the vehicle.

SUMMARY

According to one aspect, a method for operating a vehicle HVAC system includes detecting an elevated risk of water splash expulsion from an evaporator through a vent outlet and controlling a voltage supplied to at least one blower of the vehicular HVAC system to reduce a risk of water splash from the evaporator through the vent outlet if the elevated risk is detected.

According to another aspect, a controller for controlling operation of a vehicle HVAC system includes a vehicle tilt angle sensor configured to sense a vehicle tilt angle and at least one condensation sensor configured to sense a condensation value associated with a condensation risk. The controller further includes a voltage controller for controlling a voltage supplied to at least one blower of the vehicle HVAC system if the sensed vehicle tilt angle and all condensation values exceed respective threshold values set therefore.

According to yet another aspect, a controller in an integrated front and rear vehicle HVAC system including a rear evaporator disposed between a rear blower fan and at least one rear vent outlet, and a front blower for a front portion of the HVAC system includes a vehicle tilt angle sensor configured to sense a vehicle tilt angle, at least one condensation sensor configured to sense conditions associated with the condensation risk within the vehicle HVAC system, a memory storing threshold values for the vehicle tilt angle and each of the conditions sensed by the condensation sensors, and a voltage controller that controls the voltage supplied to the rear blower of the vehicle HVAC system if each of the sensed values exceeds the respective threshold values.

DETAILED DESCRIPTION

Figure 1A:
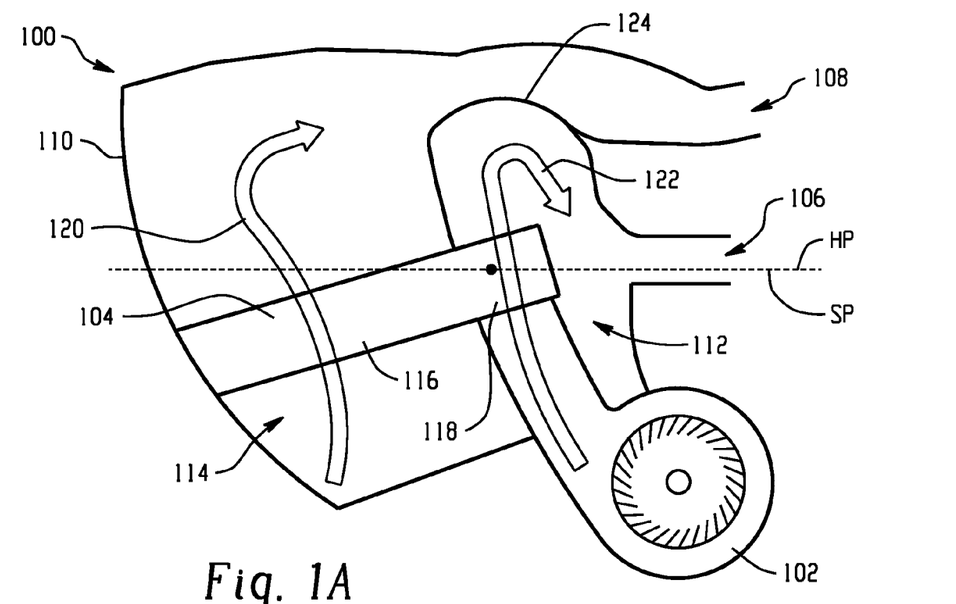
FIG. 1A is a side sectional view illustrating an integrated front and rear vehicle HVAC system provided in a vehicle resting on a horizontal plane.

Referring now to the drawings, wherein the showings are for purposes of illustrating one or more exemplary embodiments and not for purposes of limiting same, FIG. 1A shows an integrated front and rear vehicle HVAC system 100 that includes a rear blower 102 and a front blower (not illustrated) for generating an air flow, an evaporator 104, a rear vent outlet 106, a front vent outlet 108, and a casing 110. The casing 110 may generally be described as a shell for the HVAC system 100, and defines therein a rear air flow path 112 and a front air flow path 114. The rear air flow path 112 is a path for air travel between the rear blower 102 and the rear vent outlet 106. Air flow originating from the rear blower 102 and following the rear air flow path 112 passes through the evaporator 104 for conditioning and cooling. Similarly, air flow originating from the front blower and following the front air flow path 114 also passes through the evaporator 104 for conditioning and cooling.

It will be appreciated that the HVAC system 100 includes other components and features associated with the operation thereof that are readily known and understood by those skilled in the art. To simplify the explanation of the present control method and apparatus, only the components particularly related to controlling operation of the HVAC system 100 so as to prevent water splash expulsion are described herein. The additional components and features may be incorporated with the HVAC system 100 described herein. Further, the control method and apparatus are described with reference to preventing water splash output from the rear vent outlet 106 of a front and rear integrated HVAC system 100. For this reason, certain HVAC components related to the climate controlling operation for the vehicle cabin front region, such as the front blower, are not illustrated. However, it is also to be appreciated that the subject control method and apparatus can similarly be applied for use with respect to a other vent outlets. For example, the control method and apparatus may be applied to prevent water splash output from the front vent outlet 108, driver and passenger side vent outlets, and third row vent outlets.

A representative front air flow arrow 120 and a representative rear air flow arrow 122 are illustrated in FIG. 1A. The air flow arrows 120, 122 are provided to serve as representative paths followed by air flow originating from the front blower and the rear blower 102, respectively. With particular reference to the representative rear air flow arrow 122, it is noted that the air flow originating from the rear blower 102 moves in a relatively straight line therefrom, so as to pass through the evaporator 104. It is only upon contacting a bend portion 124 in the rear air flow path 112 that the rear air flow changes directions. Particularly, the rear air flow is rerouted at the bend portion 124 toward the rear vent outlet 106 so as to be output therefrom.

The evaporator 104 longitudinally extends through the casing 110 so as to have a portion disposed in the front air flow path 114 and a portion disposed in the rear air flow path 112. The portion of the evaporator 104 disposed in the front air flow path 114 is referred to herein as a front evaporator portion 116, and the portion of the evaporator 104 disposed in the rear air flow path 112 is referred to herein as a rear evaporator portion 118. The evaporator 104 is disposed within the casing 110 such that air flow originating from the front blower passes through the front evaporator portion 116 prior to reaching and being output from the front vent outlet 108, and air flow originating from the rear blower 102 passes through the rear evaporator portion 118 prior to reaching and being output from the rear vent outlet 106.

The evaporator 104 operates in a generally conventional manner, as will be appreciated, so as to cool and remove humidity from air flow that passes therethrough (e.g., condition). Generally, the evaporator 104 can include a series of tubes (not illustrated), through which refrigerant passes, and a plurality of fins (not illustrated). During operation and under certain conditions, condensation (e.g., liquid moisture, such as water) may form on the tubes and fins of the evaporator 104. The particular conditions or factors contributing to the formation of condensation will be described in further detail below. Presently, it is noted that through the understanding of the conditions and factors contributing to condensation formation, a condensation risk can be assessed through the sensing or measuring of the various factors. As used herein, the term "condensation risk" refers to a likelihood or probability of condensation forming on the evaporator 104. It is further noted that as the condensation risk increases, the expected amount of condensation formed on the evaporator similarly increases.

FIG. 1A illustrates the HVAC system 100 when such is disposed in a vehicle resting on a generally horizontal plane (e.g., a surface having an insubstantial slope), which is indicated by the horizontal plane dotted line HP. It has been observed that while in the horizontal orientation illustrated in FIG. 1A, the risk of water splash output from the rear vent outlet 106 is generally reduced. The reduction in risk may be due to the configuration of the rear air flow path 112 and/or the relative disposition of the rear blower 102, the evaporator 104, and/or the rear vent outlet 106. More particularly, the evaporator 104, when the vehicle is resting on a generally horizontal plane, is provided at an inclined orientation which facilitates flow of condensation toward a drain mechanism (not shown). As such, when oriented as shown in FIG. 1A, condensation moves in a downward direction away from the rear vent outlet 106 along the evaporator 104 as a result of gravity, and drains from the evaporator 104 without significant risk of water splash output from the rear vent outlet 106.

Figure 1B:
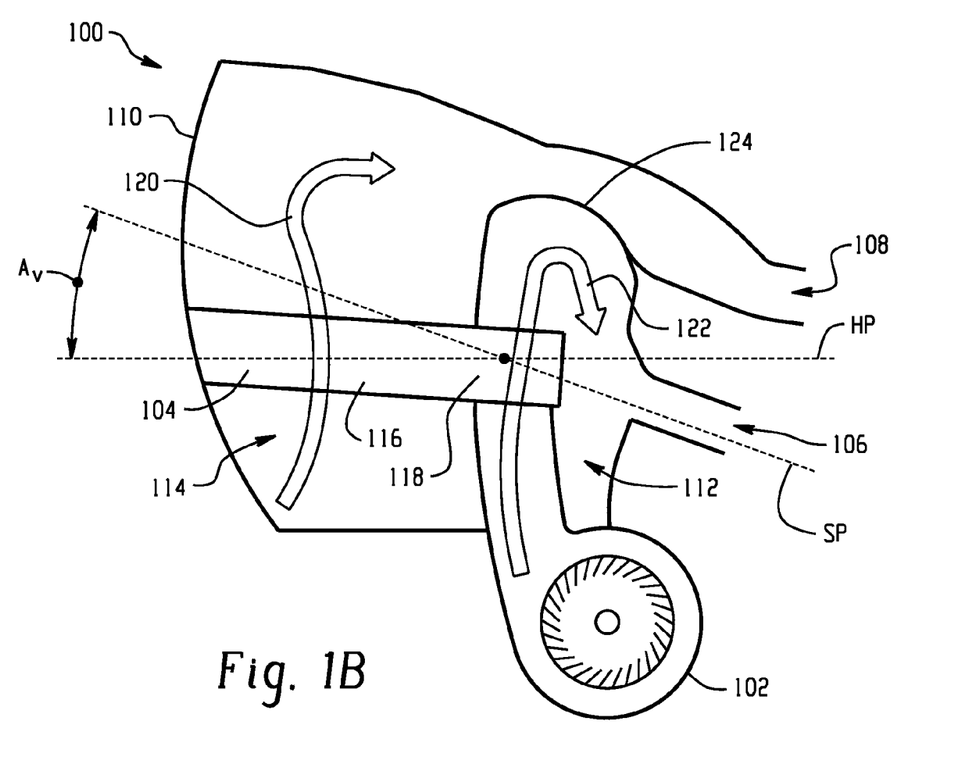
FIG. 1B is a side sectional view illustrating the integrated front and rear vehicle HVAC system provided in a vehicle resting on an inclined plane.

Real-world conditions often involve the vehicle being situated on an inclined or sloped road surface. FIG. 1B illustrates the HVAC system 100 provided in a vehicle situated on a road surface having an incline of "Av" degrees. The sloped plane dotted line SP indicates an orientation of the HVAC system 100 when inclined. When situated in the inclined position shown in FIG. 1B, it has been observed that the risk of water splash from the evaporator rear portion 118 passing through the rear vent outlet 106 is increased.

Though the configuration of the rear air flow path 112 does not change when the HVAC system 100 is disposed on an incline, a direction component of the combined forces acting on the condensation from the rear blower 102 and gravity relative to the evaporator 104, the evaporator rear portion 118, and the rear vent outlet 106 does change. Such is exemplified by the change in the orientation of the evaporator 104 which, as shown in FIG. 1B, may be disposed at a lesser angle of inclination when the vehicle is resting on an inclined or sloped road surface.

As a result of the changed orientation of the evaporator 104, the direction component of the forces acting on the condensation formed on the evaporator 104 relative to the rear vent outlet 106 may change, and the risk or probability of water splash being expelled from the rear vent outlet 106 may increase. More particularly, the changed orientation of the evaporator 104 may work against the configured condensation draining mechanism which exists when the vehicle is on a level or generally horizontal surface. Rather than flowing along the evaporator 104, condensation may accumulate on the evaporator 104, between fins thereof. When a force from the air flow reaches the evaporator 104 and the condensation accumulated thereon, the condensation is forced away (e.g., the condensation "splashes") from the evaporator 104 and may pass through the rear vent outlet 106. It is further noted that as the amount of condensation formed on the rear evaporator 104 increases, the risk of water splash also increases. As such, when the HVAC system 100 is in an inclined position, the air flow passing through the rear evaporator portion 118 is more likely to dislodge the condensation formed thereon and cause the condensation to be expelled from the rear vent outlet 106, resulting in a condition described herein as a water splash.

Figure 2:
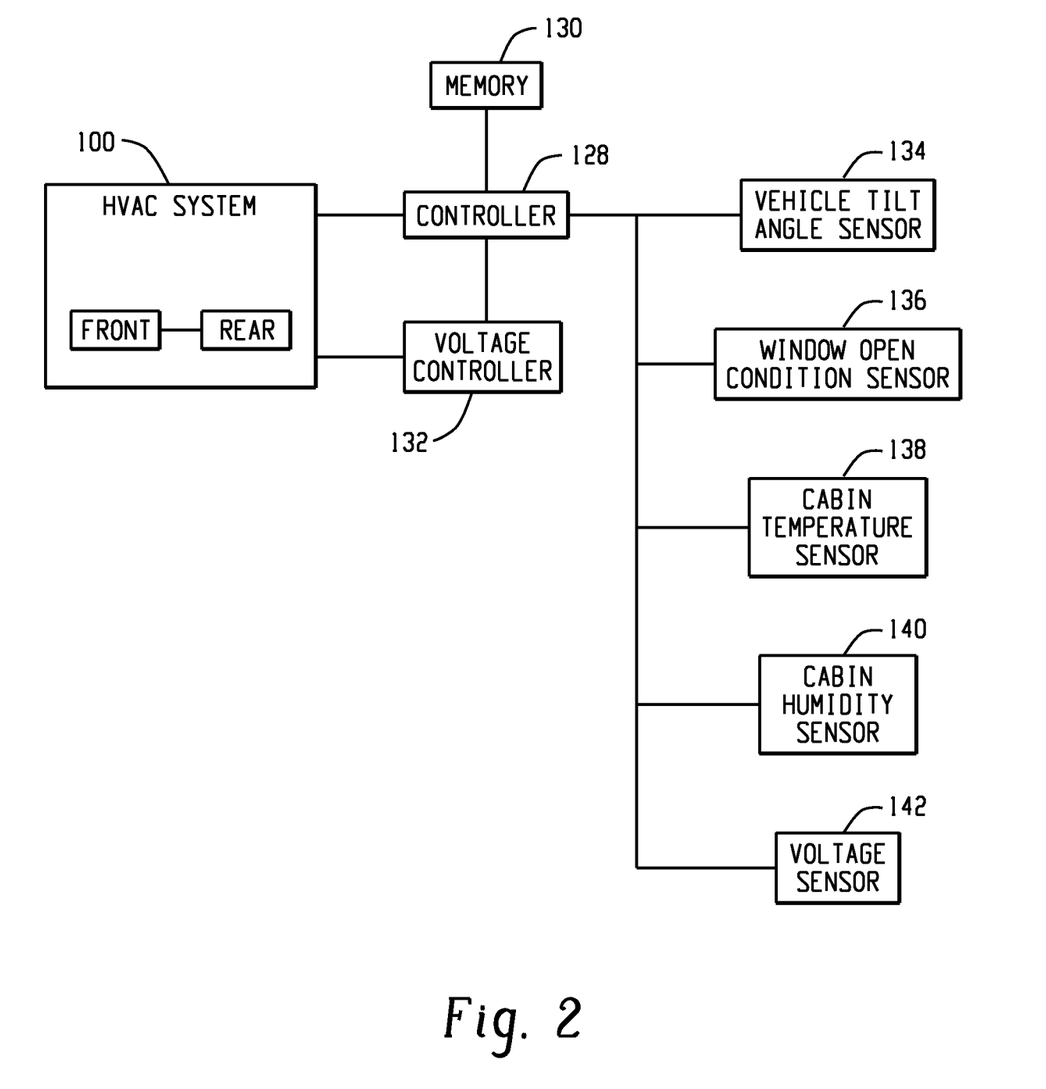
FIG. 2 schematically illustrates an HVAC control system for controlling the HVAC system.

To address the elevated risk of water splash associated with the inclined HVAC system orientation SP, or other factors related to condensation risk, a controller 128 is provided to control operation of the HVAC system 100 so as to reduce the risk of water splash. As shown in FIG. 2 and described in further detail below, the controller 128 communicates with other components of the HVAC system 100 so as to control operation thereof to reduce the risk of water splash. Specifically, the controller 128 is connected to and in communication with a memory module 130 (hereinafter, "memory 130") and a voltage controller 132, as well as a series or plurality of sensors 134-142 operable to detect conditions related to water splash and condensation risk. To reduce the risk of water splash, the controller 128 controls blower 102 of the HVAC system 100 so as to direct a particular air flow toward the evaporator 104. The particular air flow is set so as to prevent accumulation of condensation on the evaporator 104, as well as to exert a force which facilitates the prevention of dislodged condensation from passing through the rear vent outlet 106.

As shown in FIG. 2, the series of sensors can include a vehicle tilt angle sensor 134, a window open condition sensor 136, a cabin temperature sensor 138, a cabin humidity sensor 140, and a voltage sensor 142. Generally, each of the sensors 134-142 communicates with the controller 128 so as to supply sensed information to the controller 128. Based on the sensed information, the controller 128 determines appropriate operation of the HVAC system 100, and controls the HVAC system 100 to operate in accordance with instructions from the controller 128 so as to prevent water splash.

With respect to the components illustrated in FIG. 2, the controller 128 can take the form of a processor or any processing unit, such as a computer processing unit. Moreover, the controller 128 can be a single processor or can take the form of a plurality of processors, and can be separate from other components illustrated in FIG. 2, or can be incorporated with some or all of the components. As will be described in further detail below, the controller 128 is configured to operate the HVAC system 100 in accordance with a control logic and method so as to reduce and/or prevent the occurrence of water splash.

The memory 130 is provided to save certain values and/or operational instructions (such as software) associated with operation of the controller 128. The memory 130 can take the form of any standard computer memory. The memory 130 is illustrated as being connected to and in communication with the controller 128, though the memory 130 may be incorporated in the controller 128. As will be described in further detail below, the memory 130 is configured to store at least some of a plurality of threshold values associated with the sensed values from the series of sensors 134-142.

The voltage controller 132 is provided to control or adjust a voltage supplied to the rear blower 102 and the front blower (as well as any other blowers or powered HVAC system components). The voltage controller 132 is interconnected between the controller 128 and a power source (not shown) and the powered components of the HVAC system 100, and can take the form of any device capable of controlling a supplied voltage. Relevantly, the voltage controller 132 is in communication with at least the rear blower 102, and operates to regulate and/or control a voltage supplied thereto in accordance with instructions provided by the controller 128. Further, the voltage controller 132 is illustrated in FIG. 2 as being in communication with the controller 128, though it will be appreciated that the voltage controller 132 may be incorporated into the controller 128.

The vehicle tilt angle sensor 134 is provided to measure a vehicle tilt angle, defined herein as the angle Av between the horizontal plane HP and the sloped plane SP. The tilt angle sensor 134 can take the form of any device capable of detecting a tilt angle or an angle of incline, can be provided in the vehicle, such as on or near the HVAC system 100 (or in communication therewith), and is operable to detect an angle of incline of the HVAC system 100 and/or vehicle. Preferably, the tilt angle sensor 134 is operable to detect the presence of an incline, as well as a degree of incline (e.g., an angle of incline indicative of the inclined plane upon which the vehicle is situated).

The window open condition sensor 136 is provided to detect an open condition of a vehicle window (not shown). The window open condition sensor 136 can take the form of any device capable of detecting whether a vehicle window is open. To provide a window open condition output signal, the window open condition sensor 136 can be configured to provide a binary output (window open=1, window closed=0). In such a configuration, the window open condition sensor 136 can detect if any of the vehicle windows (including doors, windows, a tailgate, a tailgate window, a sunroof, a moonroof, panoramic roof panels, etc.) is/are open in any amount, or if an aggregate window open amount exceeds a preset threshold, and accordingly output a window open condition signal. Alternatively, the window open condition sensor 136 can be configured to provide a numerical value indicative of an amount or percentage of aggregate window opening. For example, assuming four openable windows in a vehicle, if one window is fully open and the three other windows are fully closed, the numerical value would correspond to a 25% open window condition.

The cabin temperature sensor 138 is provided to measure a cabin temperature and can take the form of any conventional temperature sensing device, such as a thermometer. Similarly, the cabin humidity sensor 140 is provided to measure a humidity within the vehicle cabin, and can take the form of any device capable of sensing humidity. As described herein, both the cabin temperature sensor 138 and the cabin humidity sensor 140 may be disposed within the vehicle cabin so as to detect vehicle cabin temperature and vehicle cabin humidity. Additionally, or as an alternative, a temperature sensor 138 and a humidity sensor 140 may be provided within, or adjacent to, the HVAC system casing 110 so as to monitor a temperature and a humidity within the HVAC system 100. For example, the temperature and humidity sensors 138, 140 may be provided between the rear blower 102 and the evaporator 104.

The voltage sensor 142 is provided to detect a voltage being supplied to the blowers of the HVAC system 100, and can take the form of any device capable of detecting a voltage being supplied to an electronic component, such as a blower control system. With reference to the control method and apparatus described herein, the voltage sensor 142 is provided to detect a voltage supplied to the front blower and/or the rear blower 102. The voltage sensor 142 can be in communication with the voltage controller 132 to sense a voltage supply setting at the voltage controller 132. Alternatively or additionally, the voltage sensor 142 may be in communication with the controller 128 to sense voltage supply instructions from the controller 128 to the voltage controller 132, and/or the voltage sensor 142 may be directly connected to the rear blower 102 and front blower so as to measure a voltage received thereat.

The controller 128 receives information from each of the sensors 134-142 and uses the information to determine whether, and to what extent, voltage supplied to the rear blower 102 is to be controlled. Under preferable conditions, the controller 128 will not apply any voltage control and allow the rear blower 102 to operate as instructed by the user through the user interface. However, if the controller 128 determines that a risk of water splash is unreasonably high based on the information communicated thereto from one or more of the sensors 134-142, voltage control will be performed. In determining whether voltage control is to be applied according to the subject method, the controller 128 executes a control logic that considers a condensation risk and a water splash risk.

The condensation risk describes a probability that condensation will form on the evaporator 104. As will be appreciated, the expected amount of condensation formed on the evaporator is proportional to the condensation risk. The condensation risk can be determined as a function of signals output from the sensors 134-142 and received at the controller 128, with the signals containing information related to sensed values. Particularly, the information sensed by the window open condition sensor 136, the temperature sensor 138, and the humidity sensor 140 are relevant to a determination or calculation of a condensation risk. It is to be appreciated that additional or fewer sensors may be provided, and that additional or fewer condensation risk factors may be considered. Additionally, the signals received by the controller 128 from the sensors 134-142 can be interpreted in a variety of ways to determine or calculate the condensation risk.

The water splash risk describes a probability that condensation formed on the evaporator 104 will be expelled from the rear vent outlet 106. As a greater amount of condensation is expected to be formed on the evaporator 104, the likelihood of the condensation being expelled from the rear vent outlet 106 increases. As such, the condensation risk is one factor considered in the determination or calculation of a water splash risk. Further, the likelihood of water splash expulsion from the rear vent outlet 106 increases proportionally with the air flow speed and the tilt angle. Accordingly, in addition to considering the condensation risk, the water splash risk is also determined based on information related to voltage supplied to the rear blower 102, as sensed by the voltage sensor 142, and the tilt angle Av, as sensed by the vehicle tilt angle sensor 134.

Figure 3:
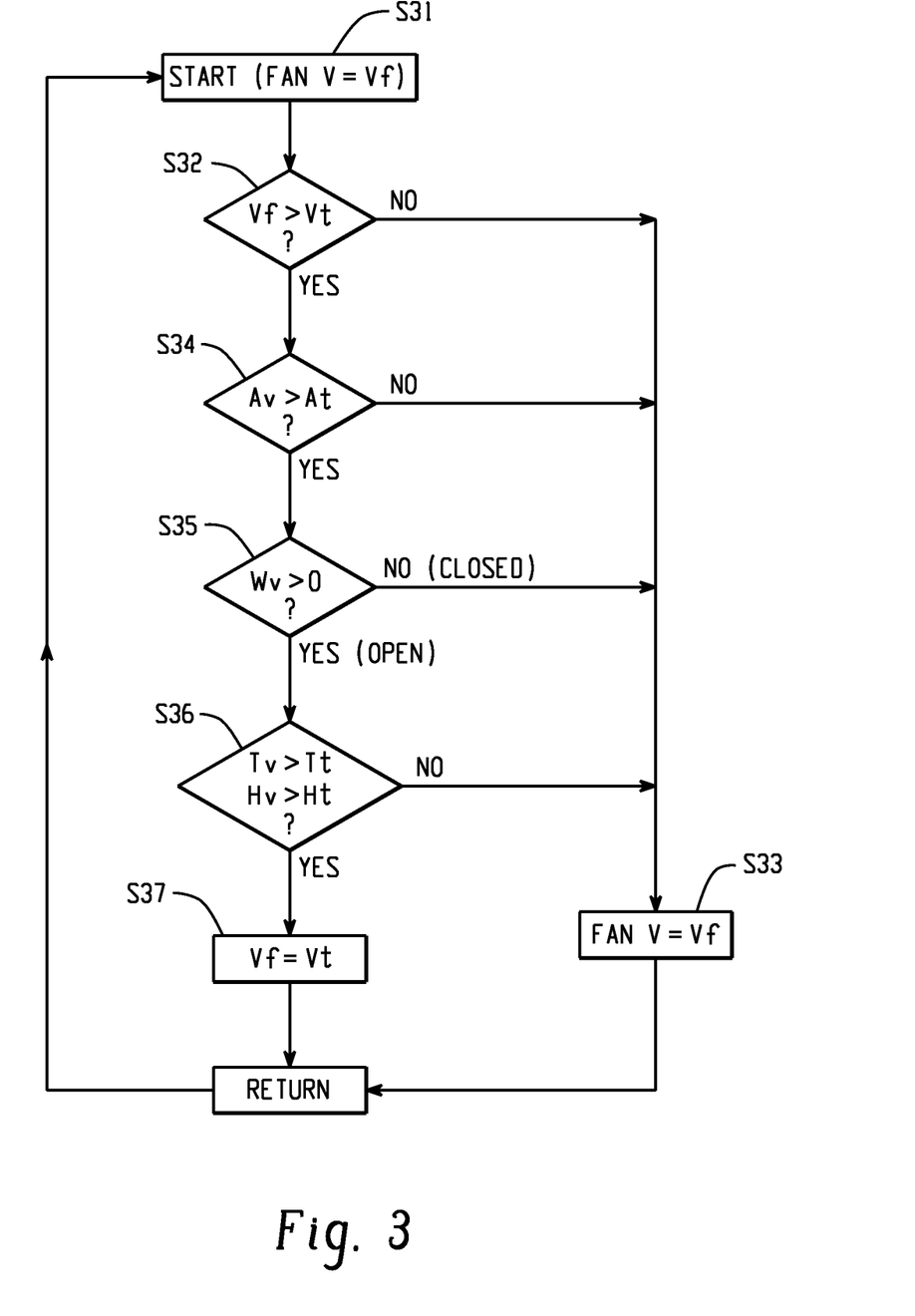
FIG. 3 is a flow chart showing a method of operating the HVAC system to prevent a water splash occurrence based on a comparison of sensed values to threshold values.
Figure 4A:
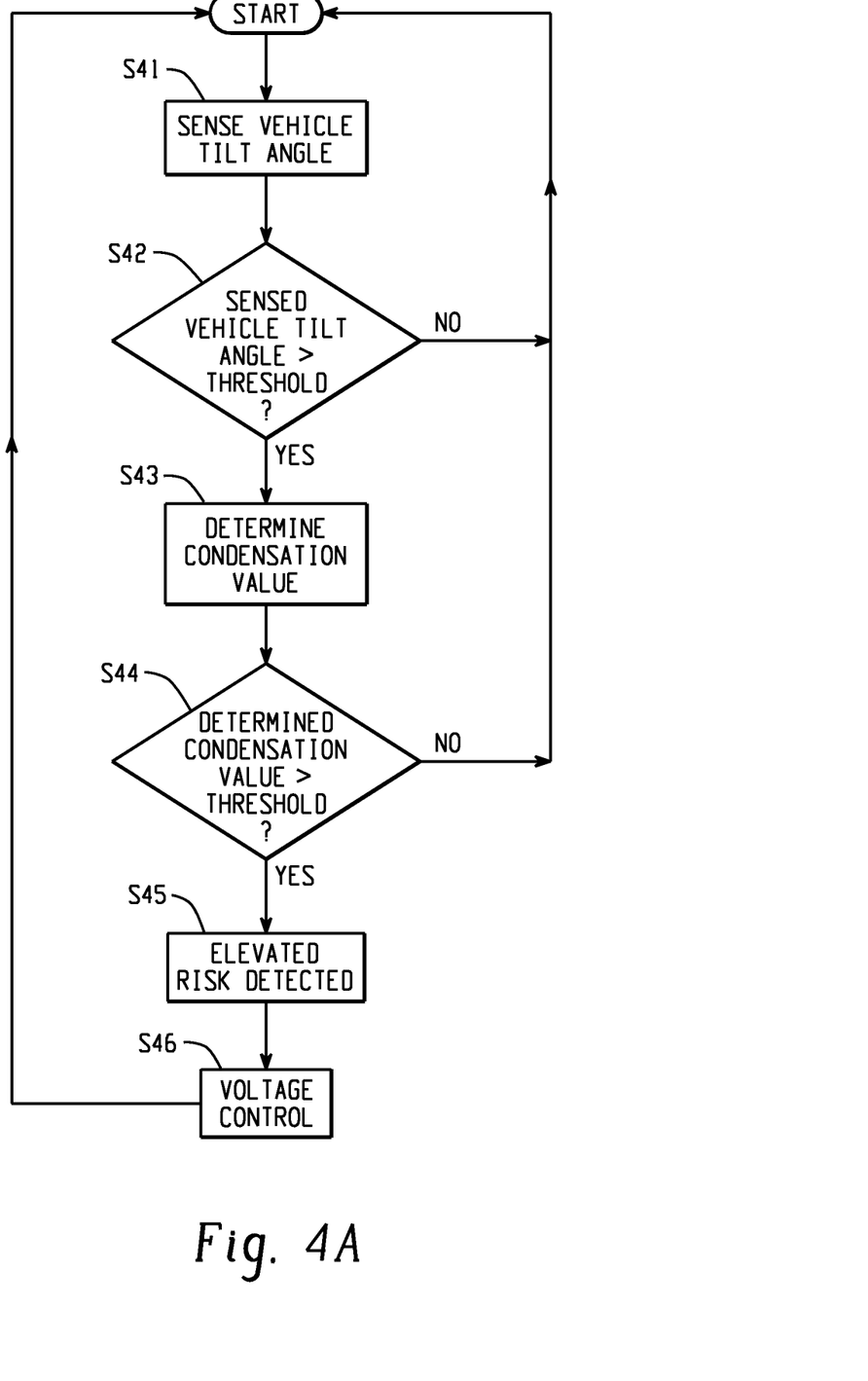
FIG. 4A is a flow chart showing a method of operating the HVAC system to prevent a water splash occurrence based on a vehicle tilt angle and a condensation value.
Figure 4B:
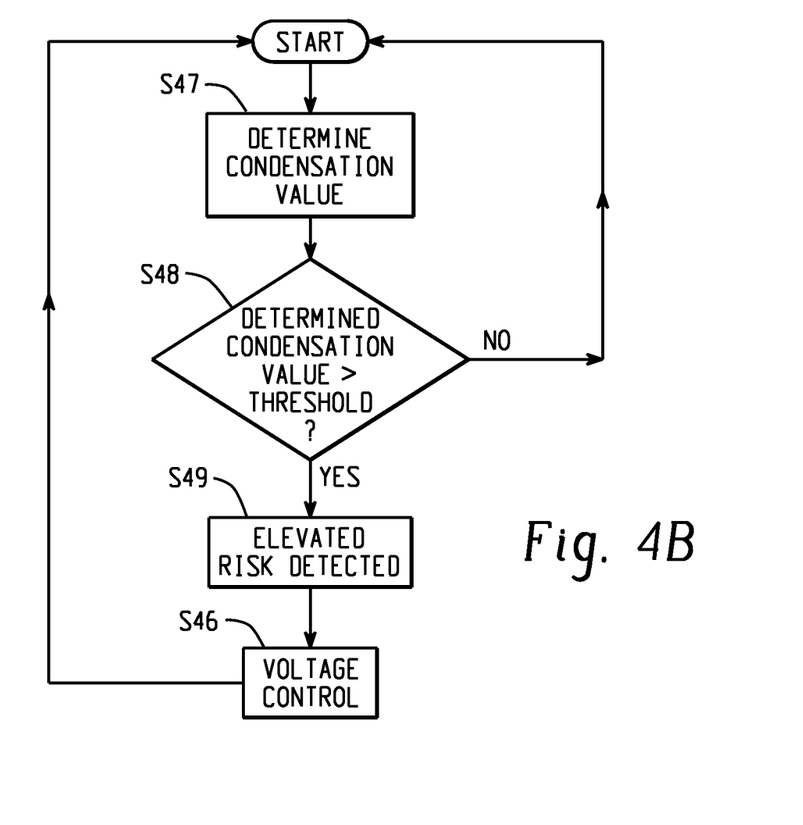
FIG. 4B is a flow chart showing a method of operating the HVAC system to prevent a water splash occurrence based on a comparison between a sensed condensation value and a threshold condensation value.
Figure 4C:
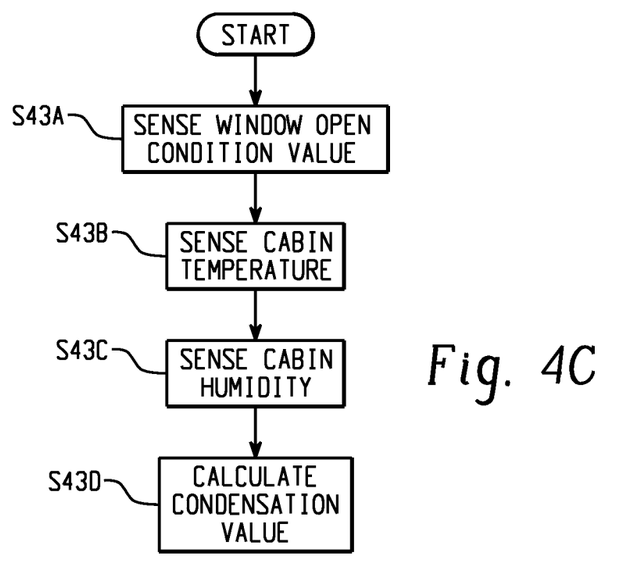
FIG. 4C is a flow chart showing a method of calculating a condensation value.
Figure 5:
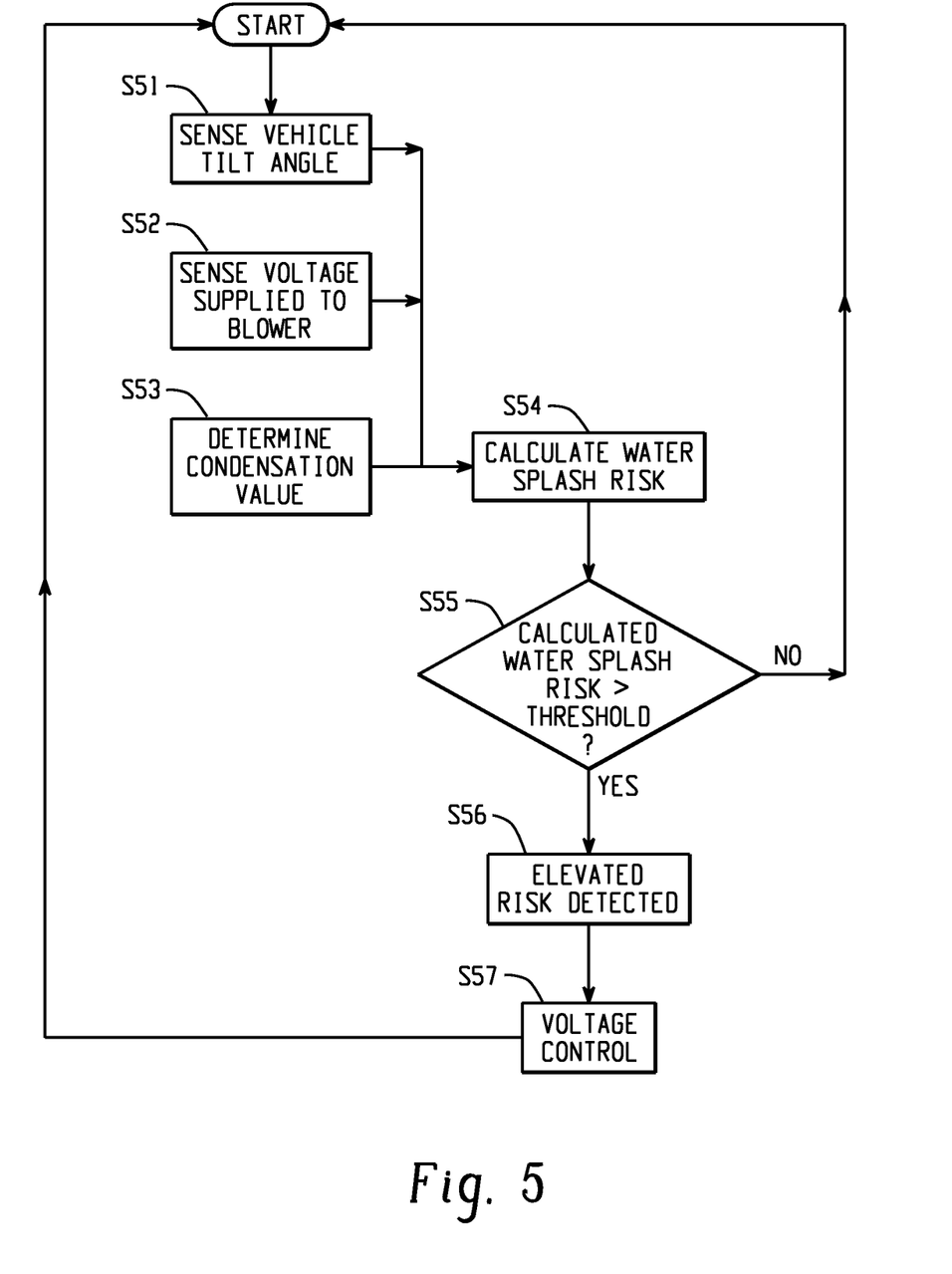
FIG. 5 is a flow chart showing a method of operating the HVAC system by calculating a water splash risk and comparing the calculated water splash risk to a threshold water splash risk.

Generally, the controller 128 is configured to receive sensed values from the sensors 134-142, determine a condensation and water splash risk, and control a voltage supplied to the rear blower 102 so as to prevent water splash occurrence when an unreasonably high water splash risk is determined. The manner in which the sensed values are processed at the controller 128 to determine whether and to what extent voltage supplied to the rear blower 102 is to be controlled can vary. FIGS. 3-5 illustrate exemplary control methods that can be applied through the controller 128 for determining control of voltage supplied to the rear blower 102. It is noted that the flow charts of FIGS. 3-5 describe a voltage control operation related to the supply of voltage to the rear blower 102 to prevent water splash expulsion from the rear vent outlet 106. However, the control can similarly be applied for the front blower and front vent outlet 108 when necessary, as well as for driver and passenger side outlets and between first, second and third row vent outlets.

A flow chart illustrating a method for controlling operation of the HVAC system 100 through comparison of each of the sensed values to a corresponding threshold value is shown in FIG. 3. The method commences at S31 with a sensing of a user-set voltage Vf presently being supplied to the rear blower 102. The user-set voltage Vf is supplied to the rear blower 102 based on instructions inputted by a user through a control panel (not shown) provided in the vehicle cabin. The user-set voltage Vf is sensed using the voltage sensor 142, and a controlled blower voltage FAN V (hereinafter, "controlled voltage FAN V") is set to the user-set voltage Vf.

The voltage supplied to the rear blower 102 is proportional to the velocity of the air flow output from the rear blower 102. As the velocity of the air flow increases, the probability of condensation formed on the evaporator rear portion 118 being expelled from the rear vent outlet 106 increases (e.g., the water splash risk increases). To determine whether the air flow velocity from the rear blower 102 presents an unreasonable risk of water splash, the user-set voltage Vf is compared to a voltage threshold value Vt at S32.

The voltage threshold value Vt may be mathematically or experimentally determined and set to a value corresponding to an air flow velocity resulting from an application of a certain voltage to the rear blower 102 at which a water splash risk is considered unreasonably high. Preferably, the voltage threshold value Vt is set such that the water splash risk is at or nearly at zero when the user-set voltage Vf is less than the voltage threshold value Vt. As such, the voltage threshold value Vt may be set to a value corresponding to a minimum rear blower 102 voltage (and resultant air flow velocity) required to cause water splash expulsion from the rear vent outlet 106, irrespective of vehicle tilt angle or condensation risk. The voltage threshold value Vt may also be set to a value at which the water splash risk is reasonably (rather than absolutely) reduced to yield a reasonably low water splash risk while minimizing variance from the user-set voltage Vf. The voltage threshold value Vt is saved in the memory 130, and is retrieved by the controller 128 when necessary for performance of the control method. As an example, the voltage threshold value Vt may be set in the range of 8 and 10.6 V.

If the user-set voltage Vf supplied to the rear blower 102 is less than the threshold voltage value Vt ('NO' at S32), it is determined that the resulting air flow velocity from the rear blower 102 does not present a sufficient water splash risk to necessitate voltage control. In other words, the water splash risk is judged to be sufficiently small so as to allow continued operation without voltage adjustment. Accordingly, the method proceeds to S33, where the controlled voltage FAN V is allowed to remain at the user-set voltage Vf.

However, if the user-set voltage Vf is greater than the threshold voltage value Vt ('YES' at S32), the air flow velocity from the rear blower 102 is determined to present a water splash risk sufficient for further consideration (potentially warranting voltage control). Generally, if the user-set voltage Vf is greater than the threshold voltage value Vt, it is determined that a water splash risk may be unreasonably high if other risk factors, including factors related to the condensation risk, similarly exceed their respective thresholds.

Accordingly, if the user-set voltage Vf is determined to be greater than the voltage threshold value Vt at S32, the method continues to receive a sensed vehicle incline or tilt angle Av at S34. Particularly, a signal indicative of the vehicle tilt angle Av sensed by the vehicle tilt angle sensor 134 is sent to the controller 128. The sensed vehicle tilt angle Av is then compared to a threshold tilt angle At.

In addition to the voltage supplied to the rear blower 102, the vehicle tilt angle Av affects the water splash risk while not being associated with the condensation risk. For reasons discussed above, the water splash risk proportionally increases with vehicle tilt angle Av. Specifically, as the vehicle tilt angle Av increases in a positive direction relative to the horizontal plane HP (e.g., the sloped plane SP of the HVAC system 100 is disposed above the horizontal plane HP at a position to a front in a vehicle direction—to the left in FIGS. 1A and 1B—of the evaporator rear portion 118), the water splash risk similarly increases.

The threshold tilt angle At can be mathematically or experimentally determined, and is preferably set at a minimum tilt angle at which the water splash risk is sufficient to warrant the application of voltage control. As with setting of the voltage threshold value Vt, the threshold tilt angle At can be set so as to either absolutely or reasonably eliminate the occurrence of water splash from the rear vent outlet 106. While the threshold tilt angle At will vary depending on the configuration of the rear air flow path 112 and the position of the rear vent outlet 106 and the evaporator 104, exemplary threshold tilt angle At may be in the range of 10-17 degrees.

Once calculated or determined, the threshold tilt angle At is stored in the memory 130 and retrieved by the controller 128 for processing in accordance with the method in S34. If the sensed tilt angle Av is less than the threshold tilt angle At, then it is determined that the water splash risk is sufficiently low, and the application of voltage control is deemed unnecessary. As such, the method proceeds to S33 wherein the controlled voltage FAN V is allowed to remain at the user-set voltage Vf. However, if the sensed tilt angle Av is greater than the threshold tilt angle At, as judged by the controller 128, it is determined that the sensed tilt angle Av is in a range where control of the voltage supplied to the rear blower 102 may be necessary to prevent water splash expulsion from the rear vent outlet 106. In other words, a sensed tilt angle Av greater than the threshold tilt angle At indicates that the water splash risk may be sufficiently high so as to necessitate voltage control to prevent the occurrence of water splash expulsion.

Moreover, as the two above-discussed factors relate only to water splash risk (user-set voltage Vf and vehicle tilt angle Av have no bearing on condensation risk), if both values are determined to exceed their respective thresholds, then consideration of the condensation risk, including the condensation risk factors, may be deemed necessary to determine whether voltage control need be applied. Accordingly, when the user-set voltage Vf and the tilt angle Av exceed their respective threshold values Vt, At, the method proceeds to determine whether a sufficiently high condensation risk exists to warrant voltage control at S35 and S36.

The condensation risk is intended to provide an indication of the likelihood, and expected amount, of condensed liquid forming on the evaporator 104. Generally stated, if the user-set voltage Vf is greater than the threshold voltage value Vt, the tilt angle Av is greater than the threshold tilt angle At, and the determined/calculated condensation risk is greater than a threshold condensation risk, the water splash risk is ultimately judged to be unreasonably high, and voltage control is performed. It is noted that determination of the water splash risk benefits from a consideration of the condensation risk as the likelihood or amount of condensed liquid formed on the evaporator 104 influences the likelihood of water being expelled from the rear vent outlet 106.

As discussed briefly above, the condensation risk may be determined in view of a window open/closed condition Wv, a cabin temperature value Tv, and a cabin humidity value Hv. Values for each of these factors are sensed using the window open condition sensor 136, the cabin temperature sensor 138, and the cabin humidity sensor 140, respectively. Each of these factors is separately considered through comparison with a respective threshold value. If each of the factors exceed their respective threshold value, then voltage control may be deemed appropriate. However, if any of the factors do not exceed their respective threshold value, then voltage control may be deemed inappropriate, and the controlled voltage FAN V is maintained at the user-set voltage Vf at S33.

While the condensation risk factors can be considered simultaneously or in any order, FIG. 3 shows a first condensation risk determination at S35, wherein a sensed window open/closed condition Wv is judged. The window open/closed condition judgment is made by the window open condition sensor 136, which communicates a window open/closed condition signal Wv indicating a window open or window closed condition to the controller 128. The window open/closed condition sensor 136 is configured to send a binary signal to the controller 128 indicative of an open window condition (Wv=1) and a closed window condition (Wv=0). For example, if all of the windows are sensed as being closed, a zero-value signal (Wv=0) is communicated from the window open/closed condition sensor 136 to the controller 128; if any of the windows are sensed to be opened in any amount, a one-value signal (Wv=1) is communicated from the window open/closed condition sensor 136 to the controller 128.

As an alternative, a window open judgment can be made if an aggregate or total window opening among all of the openable vehicle windows exceeds a threshold percentage of total possible window opening. If so, the window open/closed condition value Wv can be set to the one-value (Wv=1). If not, the window open/closed condition value can be set to the zero-value (Wv=0). In this arrangement, the window open condition sensor 136 can be configured to detect a total window open amount relative to a total possible window open amount, and determine whether the window open amount exceeds the threshold value. Alternatively, the window open condition sensor 136 can send the window open/closed condition value Wv to the controller 128, and the controller can compare the window open/closed condition value Wv to the threshold window open/closed condition value.

If the window open/closed condition value Wv is sensed as a zero-value (Wv=0), which is indicative of the windows being closed, then the condensation risk is judged to be sufficiently low so as to not require voltage control for the rear blower 102 to prevent water splash expulsion from the rear vent outlet 106. Accordingly, the user-set voltage Vf is maintained at S33. However, if the window open condition value Wv is sensed as a one-value, which is indicative of the windows being open, then it is determined that the condensation risk presented by the window open condition warrants further consideration to ascertain whether an unreasonably high water splash and condensation risk exists to warrant voltage control.

Consideration of the condensation risk continues in S36, wherein a vehicle temperature value Tv is sensed by the vehicle cabin temperature sensor 138 and supplied to the controller 128. Additionally, though the operations may be undertaken separately, a vehicle humidity value Hv is sensed by the cabin humidity sensor 140 and supplied to the controller 128. The sensed temperature value Tv is then compared with a threshold temperature value Tt, and the sensed humidity value Hv is compared with a threshold humidity value Ht.

The threshold temperature value Tt and the threshold humidity value Ht can be mathematically or experimentally determined, and are stored for retrieval by the controller 128 in the memory 130. The threshold temperature value Tt and the threshold humidity value Ht are determined based on a threshold temperature and humidity at which the condensation risk is believed to rise above an acceptable level. As cabin temperature and humidity rise, the likelihood or risk of condensation formation on the evaporator 104 increases; whereas the likelihood or risk of condensation formation decreases as the cabin temperature and humidity decrease. Determination of the threshold values Tt, Ht is made in view of these factors so as to sufficiently prevent water splash expulsion from the rear vent outlet 106 through voltage control, while minimizing any interference in user-set preferences, such as a voltage to be supplied to the rear blower 102. As an example, the threshold temperature value may be in the range of 10-40° C. and the threshold humidity value may be in the range of 10-70%.

If either the temperature value Tv or the humidity value Hv is less than its respective threshold Tt, Ht, then the condensation risk is determined to be sufficiently low so as to not require control of voltage supplied to the rear blower 102. As such, the controlled voltage FAN V is maintained at the user-set voltage Vf at S33. However, if both the temperature value Tv and the humidity value Hv are greater than their respective thresholds Tt, Ht, it is determined that a sufficiently high condensation risk exists so as to require control of voltage supplied to the rear blower 102. Accordingly, at S37, the voltage supplied to the rear blower 102 is set to the threshold voltage value Vt. In other words, the controlled voltage FAN V is set to equal the threshold voltage value Vt. Voltage control is applied by the controller 128 in conjunction with the voltage controller 132.

The method described with respect to FIG. 3 considers each of the sensed values independently by communicating the sensed values Vf, Av, Wv, Tv, and Hv to the controller 128, and comparing each of the values with a respective threshold value Vt, At, Wv=0, Tt, and Ht. If any of the sensed values are less than or equal to their respective threshold value, then the controller 128 determines that control of voltage supplied to the rear blower 102 is not necessary. If all of the sensed values exceed their respective thresholds, then control of voltage supplied to the rear blower 102 is deemed necessary and is therefore undertaken in accordance with S37.

As an alternative, some of the values, especially those which may be interrelated, may be considered together. With reference to the voltage threshold value Vt and the threshold tilt angle At, it is noted that as an alternative to the set threshold values described above, each of these values may be variably determined in consideration of a sensed value of the other. For example, the voltage threshold value Vt may be variably set to adjust based on the vehicle tilt angle Av, and vice versa. In such a configuration, the voltage threshold value Vt may be set to 10.6V when the tilt angle Av is between 10 and 12 degrees, 9.2V when the tilt angle is between 12 and 14 degrees, and 8V when the tilt angle is greater than 17 degrees.

It is further noted that the threshold temperature value Tt and the threshold humidity value Ht may be interrelated, and each may be variably set based on a sensed value of the other. In this regard, the condensation risk, as such is related to temperature and humidity, may have variable dew point thresholds for each of the temperature and humidity as one or the other changes. For example, as the temperature value Tv increases, the threshold humidity value Ht may decrease, and vice versa. Similarly, as the humidity value Hv increases, the threshold temperature value Tt may decrease, and vice versa.

Moreover, each of the threshold values associated with the condensation risk can be determined with respect to other threshold values, such that a threshold value balancing takes place. Accordingly, the control method and associated controller 128 can also be configured to balance the sensed values and factors contributing to condensation risk. A balanced condensation value considering method is illustrated in FIG. 4A.

The method associated with FIG. 4A begins by sensing the vehicle tilt angle Av (at S41) and comparing the tilt angle Av with the threshold tilt angle At. If the sensed tilt angle Av is less than the threshold tilt angle At, the water splash risk is determined to be sufficiently low such that control of voltage supplied to the rear blower 102 is deemed unnecessary. Otherwise, the method continues to consider a condensation value at S43 and S44.

The condensation value is determined by the controller 128 based on values received from the sensors 136, 138, 140 according to the method described in FIG. 4C. Particularly, a window open condition value (S43A), a cabin temperature (S43B), and a cabin humidity (S43C) are sensed using their corresponding sensors 136, 138, 140. These values are communicated to the controller 128, which executes an algorithm to calculate a condensation value at S43D. The condensation value is a value indicative of a condensation risk in view of each of the three sensed values. The particular algorithm or method for calculating a condensation risk can be ascertained from equations known in the art defining the relationships between the above factors and a condensation risk or value. For example, the condensation risk may be calculated in view of a known relationship between a temperature value Tv and a humidity value Hv, which may be expressed as a "dew point".

It is also noted that additional or fewer factors than those described herein can be considered in determining a condensation value or risk. Additionally, other factors may be considered in ascertaining a condensation risk. For example, the condensation risk may also be determined based on a relative difference between an air temperature in the cabin and an air temperature at the evaporator 104, wherein a larger difference correlates to a higher condensation risk.

Once the condensation value is determined, a comparison between the determined condensation value and a threshold condensation value is made at S44. The threshold condensation value is determined in consideration of each of the sensed values shown in FIG. 4C to determine a point at which the interplay of these factors results in an unreasonably high condensation and water splash risk. The threshold condensation value is based on a similar calculation to that for determining the condensation value, and is set such that a condensation value greater than the threshold value is deemed to present an elevated water splash risk if presented in series with a vehicle tilt angle Av greater than a threshold vehicle tilt angle At and a user-set voltage Vf greater than a threshold voltage value Vt. Once calculated, the threshold condensation value is stored in the memory 130 for retrieval by the controller 128.

The controller 128 then executes a comparison between the determined condensation value and the threshold condensation value at S44. If the determined condensation value is less than the threshold condensation value, the water splash risk is determined to be sufficiently low so as to not warrant the application of voltage control. However, if the determined condensation value exceeds the threshold condensation value, an elevated water splash risk is determined to exist at S45, and the voltage control operation is undertaken at S46. The voltage control involves setting a maximum voltage to be supplied to the rear blower 102 when an elevated risk is detected, and ensuring the voltage supplied to the rear blower 102 does not exceed the maximum value. The maximum voltage value may be identical or similar to the threshold voltage value Vt.

The method described with reference to FIG. 4A requires both the determined condensation value and the sensed vehicle tilt angle exceed their respective thresholds for a determination of an elevated water splash risk. Further, the voltage control is applied in a manner similar to that of FIG. 3, in that if the voltage supplied to the rear blower 102 exceeds the threshold voltage value, the controller 128 operates to set the voltage to the threshold voltage value. Otherwise, no voltage control is performed. The primary difference between the methods of FIG. 3 and FIG. 4A is that a plurality of sensed values are compared to their associated threshold values in the method shown in FIG. 3; and a comprehensive condensation value is determined and compared to a threshold according to the method shown in FIG. 4A.

As discussed above, the vehicle tilt angle Av and the voltage supplied to the rear blower 102 are relevant in determining a water splash risk because the illustrated HVAC system 100 defines a rear airflow path 112 wherein a water splash risk only requires voltage control when a sufficient air flow velocity from the rear blower and a certain vehicle tilt angle range are observed in conjunction with a sufficient condensation risk. However, the control method and apparatus disclosed herein is also amenable for use with HVAC systems wherein a correlation between water splash risk and condensation risk is higher.

FIG. 4B illustrates a control method for the operation of a vehicular HVAC system wherein vehicle tilt angle does not affect the water splash risk. Particularly, a method for controlling voltage supplied to the rear blower 102 in a vehicle HVAC system wherein vehicle tilt angle is at least mostly irrelevant to water splash risk includes determining a condensation value at S47. The condensation value is determined according to the method set forth in FIG. 4C and explained with reference thereto above. The determined condensation value is then compared to a threshold condensation value at S48, and an elevated water splash risk is detected at S49 if the determined condensation value exceeds the threshold condensation value. If an elevated water splash risk is detected, voltage control is applied whereby voltage supplied to the rear blower is maintained below a maximum voltage value, which may correspond to the threshold voltage value described above with reference to FIG. 3. Otherwise, no voltage control is performed.

In addition to the above methods, a control method that balances all of the above factors to determine a comprehensive water splash risk can be utilized. Particularly, as shown in the flow-chart of FIG. 5, the control method may calculate a water splash risk and compare the calculated water splash risk with a threshold water splash risk to determine whether an elevated water splash risk exists. The method illustrated in FIG. 5 includes sensing a vehicle tilt angle (S51), sensing a user-set voltage being supplied to the rear blower 102 (S52), and determining a condensation value (S53). The vehicle tilt angle and the voltage being supplied to the rear blower 102 are sensed in the same manner described above with reference to FIG. 3. The condensation value is determined as described above with reference to FIG. 4C.

Once sensed and determined, these values are sent to the controller for calculation of a comprehensive water splash risk (S54). The calculated water splash risk value is a value indicative of a water splash risk in view of each of the above values. The calculation may be performed in view of known mathematical equations defining the relationships between each of the above values. Generally, each of the values are balanced and weighted to determine a comprehensive water splash risk in view of the values. Similarly, the threshold water splash risk is calculated using the same relationships, where a set water splash risk value demarking an unreasonably high and a reasonably low risk of water splash expulsion from the rear vent outlet 106 is determined.

Once the water splash risk is calculated at the controller 128, the threshold water splash risk is retrieved from the memory 130, and the two values are compared at S55. If the calculated water splash risk value is less than the threshold water splash risk value, then an elevated risk of water splash is not detected and control of voltage supplied to the rear blower 102 is deemed unnecessary. However, if the calculated water splash risk value is determined to be greater than the threshold water splash risk value, then an elevated water splash risk is determined to exist at S56, and voltage control is performed at S57. The control of voltage supplied to the rear blower 102 is such that the rear blower 102 is supplied with no more than a maximum voltage generally corresponding to the above-discussed threshold voltage value Vt.

In view of the above-description, it is noted that a method for operating an HVAC system 100 to prevent water splash expulsion from a vent outlet can be considered to include detecting an elevated risk of water splash and controlling voltage supplied to a blower of the HVAC system 100 to reduce the risk of water splash. The detection of the elevated risk may include consideration of a vehicle tilt angle and a condensation risk or condensation value. In turn, the condensation value is determined in view of a window open condition, a cabin temperature, and a cabin humidity. These values may be combined into a comprehensive water splash risk value (as in FIG. 5), may be considered separately (as in FIG. 3), or may be considered as a condensation risk value (as in FIG. 4A). Regardless of the use, the factors are then compared to threshold values, and where the sensed and/or determined values exceed the respective thresholds, an elevated water splash risk requiring voltage control is determined to be required.

It is further noted that though the methods described herein utilize each of the window open condition, cabin temperature, and cabin humidity, determination of a condensation value can be made based on any subset of these factors, or in consideration of other factors. It will also be appreciated that any of the above-described threshold values may be predetermined values calculated or determined using any of a series of mathematical equations and/or experimentation. Each of the threshold values may be predetermined and stored in the memory 130 for later retrieval and comparison to associated sensed values by the controller 128. Though precise predetermined threshold values are not disclosed herein, a method for determination of the threshold values may include use of algorithms and experimentation.

Additionally, insofar as the above methods have been described as taking place according to a particular sequence, the sequence can be altered or the certain portions of the method can be simultaneously performed. Further, the method is also amenable to consideration of only a vehicle tilt angle and a supplied voltage. Specifically, in such a method, the sensed vehicle tilt angle Av and user-set voltage Vf are compared with threshold values, and voltage control is applied if both exceed their respective thresholds. Moreover, it is to be appreciated that any exemplary values disclosed herein are not considered to limit the disclosure to application within the exemplary values. The disclosed exemplary values may be changed to sit well outside of the disclosed ranges, or to vary significantly from the indicated exemplary value, as deemed necessary or useful in implementing the disclosed method and/or system.

It is also reiterated that though the method is described herein with reference to controlling the voltage supplied to the rear blower 102 in a front and rear integrated HVAC system 100, the description with respect thereto is considered exemplary. The disclosed method and apparatus is considered amenable for use in any vehicle HVAC system, and can be applied to any or multiple blowers or vent outlets associated with the vehicle HVAC system.

It will be appreciated that several of the above-disclosed and other features and functions are alternatives or varieties thereof may be desirably combined into many other systems or applications. Also, that various presently unforeseen or unanticipated alternatives, modifications, variations or improvements therein may be subsequently made by those skilled in the art which are also intended to be encompassed by the following claims.

The invention claimed is:

1. A method for operating a vehicular HVAC system, comprising:
   determining at least one of: a vehicle tilt angle; and a condensation value;
   detecting an elevated risk of water splash expulsion from an evaporator through a vent outlet based on at least one of the vehicle tilt angle and the condensation value, wherein the detection of the elevated risk of water splash expulsion from the evaporator through the vent outlet is made using a controller that receives the vehicle tilt angle and the condensation value as inputs, and detects the elevated risk of water splash expulsion from the evaporator through the vent outlet based on at least one of the vehicle tilt angle and the condensation value; and controlling a voltage supplied to at least one blower of the vehicular HVAC system to reduce a risk of water splash from the evaporator through the vent outlet if the elevated risk is detected, wherein the voltage supplied to the at least one blower is controlled using a voltage controller configured to control a voltage supplied to the at least one blower of the vehicular HVAC system.

2. The method according to claim 1, wherein
the vehicle tilt angle and the condensation value are both determined by respectively sensing the vehicle tilt angle using a vehicle tilt angle sensor and sensing the condensation value using at least one condensation sensor, and
detecting the elevated risk of water splash comprises:
comparing the determined vehicle tilt angle and condensation value to respective predetermined threshold values thereof using the controller; and
detecting the elevated risk of water splash if both the sensed vehicle tilt angle and condensation value exceed their respective threshold values.

3. The method according to claim 2, wherein sensing the condensation value includes sensing a window open condition using a window open condition sensor, a cabin temperature using a cabin temperature sensor, and a cabin humidity using a cabin humidity sensor, and comparing the condensation value to the threshold value includes comparing each of the sensed window open condition, cabin temperature, and cabin humidity to a respective threshold value, and
wherein the condensation value is determined to exceed the threshold condensation value if each of the sensed window open condition, cabin temperature, and cabin humidity exceed their respective threshold value.

4. The method according to claim 2, wherein sensing the condensation value includes sensing a value associated with at least one of a window open condition using a window open condition sensor, a cabin temperature using a cabin temperature sensor, and a cabin humidity using a cabin humidity sensor, and calculating the condensation value based on the sensed window open condition, a cabin temperature, and a cabin humidity.

5. The method according to claim 1, wherein detecting the elevated risk of water splash comprises:
comparing the determined condensation value to a predetermined threshold condensation value; and
detecting the elevated risk of water splash if the determined condensation value exceeds the threshold condensation value.

6. The method according to claim 5, wherein determining the condensation value includes sensing a window open condition using a window open condition sensor, a cabin temperature using a cabin temperature sensor, and a cabin humidity using a cabin humidity sensor, and comparing the condensation value to the threshold condensation value includes comparing each of the sensed window open condition, cabin temperature, and cabin humidity to a respective threshold value using the controller, and
wherein the condensation value is determined to exceed the threshold condensation value if each of the sensed window open condition, cabin temperature, and cabin humidity exceed the respective threshold value.

7. The method according to claim 5, wherein determining the condensation value includes sensing a value associated with at least one of a window open condition using a window open condition sensor, a cabin temperature using a cabin temperature sensor, and a cabin humidity using a cabin humidity sensor, and calculating the condensation value based on the sensed window open condition, a cabin temperature, and cabin humidity using the controller.

8. The method according to claim 1, wherein
the vehicle tilt angle and the condensation value are both determined by respectively sensing the vehicle title angle using a vehicle tilt angle sensor and sensing the condensation value using at least one condensation sensor,
the condensation value is determined to include at least one of a window open condition value sensed by a window open condition sensor, a cabin temperature sensed by a cabin temperature sensor, and a cabin humidity sensed by a cabin humidity sensor, and
detecting the elevated risk of water splash comprises:
sensing a voltage being supplied to the at least one blower using a voltage sensor;
calculating a water splash risk value based on the sensed vehicle tilt angle, the sensed voltage being supplied to the at least one blower, and the determined condensation value;
comparing the calculated water splash risk value with a predetermined threshold water splash risk value, wherein the predetermined threshold water splash risk value is calculated in the same manner as the calculated water splash risk value using predetermined threshold values for the vehicle tilt angle, the sensed voltage being supplied to the at least one blower, and the condensation value; and
detecting the elevated risk of water splash if the calculated water splash risk value exceeds the threshold water splash risk value.

9. The method according to claim 1, wherein controlling the voltage supplied to at least one blower further comprises:
sensing a voltage being supplied to the at least one blower using a voltage sensor;
comparing the sensed voltage to a threshold voltage using the controller; and
reducing the voltage being supplied to the at least one blower to the threshold voltage if the sensed voltage exceeds the threshold voltage and the elevated risk of water splash is detected.

10. The method according to claim 1, wherein
the vehicle tilt angle is determined by sensing a vehicle tilt angle using a vehicle tilt angle sensor; and
the elevated risk of water splash is detected if the sensed vehicle tilt angle exceeds a threshold vehicle tilt angle.

11. The method according to claim 1, wherein
the vehicle tilt angle is determined by sensing a vehicle tilt angle using a vehicle tilt angle sensor; and
detecting an elevated risk of water comprises:
sensing a user-set voltage being supplied to the at least one blower using a voltage sensor;
sensing a window open condition using a window open condition sensor and setting a window open condition value based on the window open condition;
sensing a vehicle temperature using a cabin temperature sensor;
sensing a vehicle humidity using a cabin humidity sensor; and
detecting an elevated risk of water splash if each of the vehicle tilt angle, the user-set voltage, the window open condition value, the vehicle temperature, and the vehicle humidity exceed a corresponding predetermined threshold value.

12. A controller for controlling operation of a vehicle HVAC system, comprising:

a vehicle tilt angle sensor configured to sense a vehicle tilt angle;
a condensation sensor configured to sense a condensation value associated with a condensation risk; and
a voltage controller controlling a voltage supplied to at least one blower of the vehicle HVAC system if the sensed vehicle tilt angle and the condensation value exceed respective threshold values set therefore.

13. The controller according to claim 12, further comprising a voltage sensor configured to sense a voltage being supplied to the at least one blower,
wherein the voltage controller is configured to control the voltage supplied to the at least one blower by reducing voltage supplied to the at least one blower to a threshold voltage value if the sensed voltage is greater than the threshold voltage value and the sensed vehicle tilt angle and the condensation value exceed respective threshold values set therefore.

14. The controller according to claim 12, wherein the condensation sensor comprises:
a window open condition sensor;
a temperature sensor; and
a humidity sensor.

15. The controller according to claim 12, wherein the at least one blower includes a rear blower which supplies an air flow through a rear vent outlet.

16. In an integrated front and rear vehicle HVAC system comprising a rear evaporator disposed between a rear blower fan and at least one rear vent outlet, a front blower for a front portion of the HVAC system, and a controller, the controller comprising:

a vehicle tilt angle sensor configured to sense a vehicle tilt angle;
at least one condensation sensor configured to sense conditions associated with a condensation risk; and
a voltage controller that controls a voltage supplied to the rear blower of the vehicle HVAC system if the sensed vehicle tilt angle and the sensed conditions associated with the condensation risk each exceed respective threshold values.

17. The HVAC system according to claim 16, further comprising a voltage sensor configured to sense a voltage being supplied to each of the front blower and the rear blower, and the voltage controller is configured to control the voltage supplied to the rear blower by reducing voltage supplied to the rear blower to a threshold voltage value if the sensed voltage is greater than the threshold voltage value.

18. The HVAC system according to claim 17, further comprising a memory storing threshold values for the vehicle tilt angle and each of the conditions sensed by the at least one condensation sensor.

19. The HVAC system according to claim 18, wherein the memory further stores the threshold voltage value.

20. The HVAC system according to claim 16, wherein the at least one condensation sensor comprises:
a window open condition sensor;
a cabin temperature sensor; and
a cabin humidity sensor.

* * * * *